Patented May 25, 1948

2,441,949

UNITED STATES PATENT OFFICE 2,441,949

METHOD OF SYNTHESIZING PANTOTHENIC ACID

Sidney H. Babcock, Jr., Davis, Calif., assignor to The Regents of the University of California, Berkeley, Calif., a corporation of California No Drawing. Application July 19, 1940, Serial No. 346,454

7 Claims. (Cl. 260—534)

This invention relates to a process for coupling lactones such as alpha-hydroxy-beta, beta-dimethylbutyrolactone with amino acids such as beta-alanine, or their derivatives, to produce physiologically active substances having a vitaminlike action, such as pantothenic acid, or its derivatives.

Up to the time of the present disclosure there has been no known way of synthesizing pantothenic acid. This compound has been known to exist in the natural state, but it has not been isolated, and knowledge of its existence in the past was only gained by measuring the biological effect of concentrates of pantothenic acids prepared from natural sources such as liver. It is now possible, by carrying out the present disclosure, to prepare it synthetically, thus making it possible to produce this substance as needed and on a large and improved scale.

By means of this invention, pantothenic acid may be synthesized in the following manner: Beta-alanine; 1N sodium hydroxide; and alphahydroxy-beta, beta-dimethylbutyrolactone; in a 1:1:3 molecular ratio, are mixed in that order at 0° C., and allowed to stand one hour. An amount of sodium hydroxide equivalent to the amount of free beta-alanine remaining in the solution (as determined by Sorensen formol titration) is added. After standing a second hour, the process is repeated, and is continued until ninety per cent or more of the beta-alanine has been converted to pantothenic acid. The pantothenic acid content is then measured by biological assay with chicks, according to the method published in the "Journal of Biological Chemistry," volume 117, page 11 (1937), or by other methods of biological assay, as by the use of micro-organisms. By using more concentrated alkali, hence less water, it has been possible to get a sixty per cent total conversion in the first cycle, and a ninety-five per cent conversion in the second cycle.

A still further method of producing pantothenic acid consists in mixing a metal salt, such as sodium, potassium, calcium, barium, etc., of beta-alanine with alpha-hydroxy-beta, beta-dimethylbutyrolactone directly, and warming the mixture above its melting point.

This method is an obvious extension of the idea of the use of a more concentrated alkali. In it, the sodium hydroxide and beta-alanine are mixed as before, then the water is removed by vacuum distillation, in such manner that the temperature of the solution in the distilling flask remains 30° C. or less. To the dry sodium salt of beta-alanine so obtained, the lactone is added, either in equivalent amounts or in excess, and the mixture thus obtained warmed to the melting point, usually under 100° C. After the reaction has taken place, the excess lactone is extracted with ether, or by a combination of ether and alcohol or by some other suitable solvent, leaving behind essentially pure sodium pantothenate.

Alpha-hydroxy-beta, beta-dimethylbutyrolactone has what is termed an "asymmetric carbon atom." Because of this, it exists in two enantiomorphic forms and also in a fifty-fifty mixture of the two forms. These three forms are referred to as:

d—alpha-hydroxy-beta, beta-dimethylbutyrolactone l—alpha-hydroxy-beta, beta-dimethylbutyrolactone dl—alpha-hydroxy-beta, beta-dimethylbutyrolactone In this work I have used the dl form (i. e., the mixture), but the same things would all be equally true of the d- and l-forms separately. This is important, as only one of the two enantiomorphic forms results in physiologically active pantothenic acid. Hence when the dl lactone is used, only half the product is vitamin—the d-pantothenic acid; l-pantothenic acid is not vitamin and has no activity. Dl-pantothenic acid is half as active as d-pantothenic acid. But since my method will work just as well with the d-, l- and dl-lactones, all three are specifically mentioned.

The three lactones mentioned and beta-alanine will react to produce pantothenic acid, but the reaction itself is a general one, called ammonolysis. By means of this reaction any lactone, which is a sub-class under the general group of esters, or any ester, can be united with any amino acid or any amine to produce compounds of a similar type, such as homologs of pantothenic acid or homologs of desoxypantothenic acid, and similar compounds, belonging to the general class known as N-substituted amides.

Many chemical reactions are of the equilibrium type, represented by the following equation:

$$A+B \rightleftharpoons C+D$$

When any two reactants A and B form two products C and D, it frequently happens that the products can inter-react to re-form the reactants. A condition of equilibrium results wherein, for every pair of reactant molecules forming product molecules, a pair of product molecules form reactant molecules. The point at which this equilibrium lies is dependent upon the nature of the molecules involved. This point might be anywhere between the two points where (a) The amount of the reactants left when equilibrium is established is negligibly small, and (b) The amount of products formed is negligibly small.

Of the various methods of shifting an equilibrium, two will be mentioned:

(a) An excess of one of the reactants can be used. By this means, a greater percentage of the other reactant is converted into product molecules. This is practically useful whenever one of the reactants is cheap and the other expensive.

(b) One of the products can be removed as fast as it is formed. This is a corollary to (a), for it diminishes the amount of one of the products, and continually upsets the equilibrium, until finally all or most of the reactants are converted to products. To accomplish this, the product need not necessarily be taken out of the mixture bodily; it suffices to convert it, in situ, to some other molecule which will not react.

The equations for the reactions involved in this application, using structural formulae, are as follows:

(1) $NH_3^+CH_2CH_2CO_2^- + OH^- \rightleftharpoons NH_2CH_2CH_2CO_2^- + H_2O$ (Beta-alanine) (Hydroxide ion) (Anion of any salt of beta-alanine) (Water)

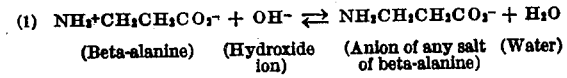

(Alpha-hydroxy-beta, beta-dimethylbutyrolactone)     (Anion of any salt of beta-alanine)

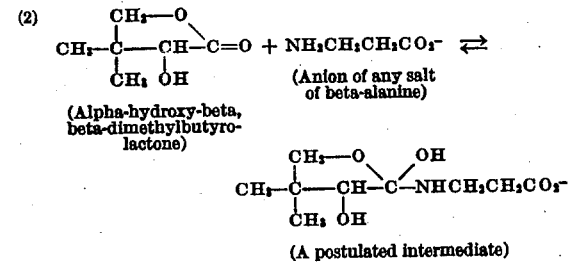

(A postulated intermediate)

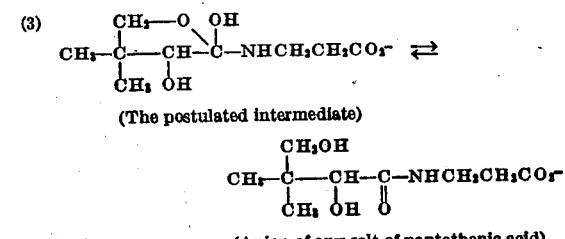

(The postulated intermediate)

(Anion of any salt of pantothenic acid)

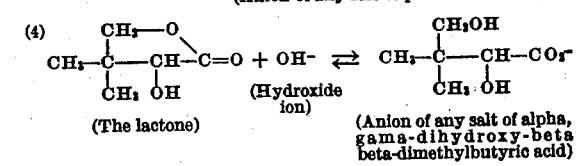

(The lactone) (Hydroxide ion) (Anion of any salt of alpha, gama-dihydroxy-beta beta-dimethylbutyric acid)

Equation 1 is an equilibrium known to exist mainly in the form of its products. By it beta-alanine, which will not react with the lactone, is converted to the anion of one of its salts. To furnish the hydroxide ion, any water-soluble strong alkaline base may be used, including sodium, potassium and lithium; or an alkaline earth base such as barium hydroxide.

Equation 2 is an equilibrium reaction in which, if lactone and anion of beta-alanine are mixed in equimolecular proportions, fifty per cent of the beta-alanine remains unchanged, as determined by the Sorensen formol titration.

Equation 3 is apparently a reaction in which the equilibrium exists at a point where all or nearly all of the mixture exists as product, and little, if any, exists as reactants.

Equation 4 is of the same type as Equation 3.

When the solution of sodium hydroxide, beta-alanine, and the lactone is mixed, all four equilibria are set up. Notice that Equation 2 uses up one of the products (the anion of beta-alanine) of Equation 1. This would tend to shift the equilibrium in Equation 1 to the right. However, Equation 4, which goes on simultaneously, uses up one of the reactants (the hydroxide ion, OH⁻) of Equation 1, thus having the reverse effect.

But if the Reaction 1 is reversed, note that that means that the beta-alanine anion is converted back to beta-alanine, and that means it is taken out as reactant in Equation 2, and that that reaction is reversed.

This is counterbalanced by the fact that in Reaction 3 the equilibrium point lies so far to the right that for all practical purposes it may be said that the reaction is irreversible, and that as soon as any pantothenic acid anion is formed the reactants which go into making it are essentially removed from the solution.

Hence, there are two forces acting on the beta-alanine anion: Equation 3 pulls it through the intermediate product to form pantothenic acid anion; and Equation 4 pulls it back through Equation 1 to form beta-alanine. All this takes about an hour. At the end of this hour, if equimolecular amounts of the three reagents have been taken, there are present:

(a) Anion of pantothenic acid
(b) Anion of alpha, gamma-dihydroxy-beta, beta-dimethyl butyric acid
(c) Beta-alanine
(d) The water used as solvent.

By experiment it was found that, after an hour, (a), (b) and (c) were present in equal amounts, i. e., half the material went through the Reactions 1, 2 and 3, and the other half went through Reaction 4.

Now suppose a large excess of lactone, such as three molecules for one of each of the other reagents, is used. The first effect is that the excess of lactone shifts the equilibrium of Equation 2 to the right, so that only 45% of the beta-alanine anion remains, and at the end of one hour there are now present, for each molecule of beta-alanine originally used:

| | Mol |
|---|---|
| (a) Anion of pantothenic acid | 0.55 |
| (b) Anion of alpha, gamma-dihydroxy-beta, beta-dimethyl butyric acid | .45 |
| (c) Beta-alanine | .45 |
| (d) Excess lactone | 2.00 |
| (e) Solvent water | |

Since (a) and (b) are to all intents and purposes irreversibly formed, the situation is the same as if they were not present, with respect to the other equilibria. Lactone and beta-alanine are now present in the ratio of 2 mols to 0.45 mol, or 4:1, but there is no hydroxide ion (OH⁻) left. Therefore, 0.45 mol of OH⁻ (the amount equivalent to the unreacted beta-alanine) is now added, and the whole cycle is repeated, with the net result of increasing the amounts of (a) and (b) present, and decreasing the amounts of (c) and (d).

It might be supposed that since, in the process, the ratio of lactone to unreacted beta-alanine is continually increasing, the percentage of the remainder of the beta-alanine converted each time would also increase. However, this is more than counterbalanced by the fact that the concentration of beta-alanine is steadily diminishing, so that the hydroxide ion has an increasingly greater opportunity for reacting with the lactone instead, since the rate of decrease of the concentration of the latter is much less; hence, diminishing amounts of beta-alanine are converted by the repetition of the process.

Pantothenic acid preparations made by the process outlined in this application have physiological or vitamin-like activity for species other than chicks. For example, Dr. F. Daft and Dr. W. H. Sebrell, of the National Institute of Health at Washington, D. C., have found that such a preparation was effective in preventing or curing degeneration of the adrenal glands in rats. Vitamin-like activity of pantothenic acid may also be expected in the case of other species. Experimental work on this question is in progress in various laboratories in this country. The reference specifically to chicks in this application is due to the fact that this species is convenient for the biological assay of substances which have "pantothenic acid activity." Once such activity has been established by means of the biological assay with chicks, the use of the preparation for other species may be expected, under the correct conditions of use, to result in therapeutic or vitamin-like action.

Of the amino acids employed, beta-alanine has been specifically referred to, but other forms may be used if closely related, such as beta-amino butyric acid. Derivatives of beta-alanine which leave it with an $NH_2$ instead of an $NH_3$ group may be employed. This would include the following:

Methyl ester

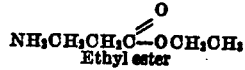
Ethyl ester

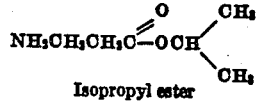
Isopropyl ester

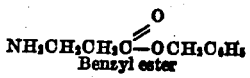
Benzyl ester and amides such as beta-alanyl amide and other commonly recognized derivatives.

Alpha-hydroxy-beta, beta-dimethylbutyrolactone has also been specifically referred to, especially the dl form thereof, but the d- or l-form may also be employed, and related lactones such as butyrolactone and alpha-hydroxy-butyrolactone. Similarly, any water-soluble base may be used, such as potassium, sodium, or barium hydroxide. A 1:1:3 ratio of the ingredients employed has been stated, but other ratios are possible, such as 1:1:2, 1:1:4, etc., and the solution of sodium hydroxide may be increased in strength, as a 3.3 normal solution has been specified. Furthermore, while certain other features of my invention have been more or less specifically described, I nevertheless wish it understood that changes may be resorted to within the scope of the appended claims.

Having thus described my invention, what I claim and desire to secure by Letters Patent is

1. The method of synthesizing pantothenic acid which consists of coupling alpha-hydroxy-beta, beta-dimethylbutyrolactone with beta-alanine in the presence of an alkaline solution of an alkali-forming metal hydroxide.

2. The method of synthesizing pantothenic acid which consists of coupling alpha-hydroxy-beta, beta-dimethylbutyrolactone with beta-alanine in the presence of a solution of sodium hydroxide.

3. The method of synthesizing pantothenic acid which comprises directly combining an alkali-forming metal salt of $\beta$-alanine with $\alpha$-hydroxy-$\beta$, $\beta$-dimethyl-$\lambda$-butyro lactone.

4. The method of claim 3, carried out in the cold.

5. The method of claim 3, carried out at a temperature of approximately 0° C.

6. The method of claim 3, carried out in an aqueous medium.

7. The method of claim 3, carried out in an aqueous medium at approximately 0° C.

SIDNEY H. BABCOCK, Jr.

REFERENCES CITED

The following references are of record in the file of this patent:

UNITED STATES PATENTS

| Number | Name | Date |
| --- | --- | --- |
| 2,056,126 | Reichstein | Sept. 29, 1936 |
| 2,063,987 | Dreyfus | Dec. 15, 1936 |
| 2,271,872 | Mitchell | Feb. 3, 1942 |
| 2,414,682 | Williams | Jan. 21, 1947 |

FOREIGN PATENTS

| Number | Country | Date |
| --- | --- | --- |
| 535,988 | Great Britain | Apr. 29, 1941 |

OTHER REFERENCES

McArdle, "Solvents in Synthetic Org. Chem." (van Nostrand) pages 1-3, 21 (1925).

Chem. Abstracts, vol. 23, p. 1113 (1929).

Chem. Abstracts, vol. 23, p. 2991 (1929).

Williams et al., J. Am. Chem. Soc., vol. 55, pp. 2912-2927 (1933).

Williams et al., J. Am. Chem. Soc., vol. 56, p. 169 (1934).

Williams et al., J. Am. Chem. Soc., vol. 60 p. 2719-2723 (1938).

Karrer, "Organic Chemistry (Nordeman), p. 91 (1938).

Snell et al., J. of Bacteriology, vol. 38, pp. 297-304 (1939).

Williams Science, vol. 89, p. 486 (1939).

Williams et al., J. Am. Chem. Soc., vol. 61, pp. 454-457 (1939).

Williams et al., Science, vol. 91, p. 246 (3/8/40).

Weinstock et al., Science, vol. 91, p. 411 (4/26/40).